(12) United States Patent
Delbaere et al.

(10) Patent No.: US 9,506,816 B2
(45) Date of Patent: Nov. 29, 2016

(54) METHOD FOR EVALUATING THE TEMPERATURE OF AN ELECTRO-MAGNETIC CONTACTOR AND CONTACTOR FOR IMPLEMENTATION OF SAID METHOD

(71) Applicant: Schneider Electric Industries SAS, Rueil-Malmaison (FR)

(72) Inventors: Stéphane Delbaere, Saint Martin d'Uriage (FR); Rémy Orban, Grenoble (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 755 days.

(21) Appl. No.: 13/686,470

(22) Filed: Nov. 27, 2012

(65) Prior Publication Data

US 2013/0144552 A1 Jun. 6, 2013

(30) Foreign Application Priority Data

Dec. 2, 2011 (FR) ...................................... 11 03682

(51) Int. Cl.
*G01K 7/00* (2006.01)
*G06F 17/00* (2006.01)
*H01H 47/26* (2006.01)
*H01H 50/00* (2006.01)
(Continued)

(52) U.S. Cl.
CPC ................. *G01K 7/00* (2013.01); *G06F 17/00* (2013.01); *H01H 47/26* (2013.01); *H01H 50/00* (2013.01); *H01H 50/12* (2013.01); *H01H 2047/025* (2013.01)

(58) Field of Classification Search
CPC ........ G01K 7/00; H01H 50/00; H01H 47/26; H01H 2047/025; H01H 50/12; G06F 17/00
USPC .................... 702/133; 335/8, 132, 201, 253; 361/142, 154, 160, 170, 187
See application file for complete search history.

(56) References Cited

U.S. PATENT DOCUMENTS 5,087,869 A * 2/1992 Kuriyama et al. .............. 322/15
6,411,489 B1 * 6/2002 Kappel et al. ................ 361/160
(Continued)

FOREIGN PATENT DOCUMENTS

EP 1 067 571 A2 1/2001
EP 1 120 805 A2 8/2001
(Continued)

*Primary Examiner* — Carol S Tsai
(74) *Attorney, Agent, or Firm* — Steptoe & Johnson LLP

(57) ABSTRACT

A method for evaluating the temperature of a contactor comprising a processing unit designed to act on control means of the voltage applied to an actuating coil. Measuring means measure an electric current flowing in said at least one actuating coil. The method consists in:
- sending a closing order consisting in applying a voltage to the terminals of the actuating coil enabling the electric current flowing in the coil to be modified up to a first reference value;
- sending a drop-out order consisting in fixing a voltage called drop-out voltage at the terminals of the actuating coil;
- measuring the electric current flowing in said actuating coil;
- performing acquisition of specific values on a signal of the electric current;
- analyzing specific values for evaluation of the operating temperature of the actuating coil.

13 Claims, 4 Drawing Sheets

(51) Int. Cl.
*H01H 50/12* (2006.01)
*H01H 47/02* (2006.01)

(56) References Cited

U.S. PATENT DOCUMENTS

| | | | |
|---|---|---|---|
| 6,520,279 B2* | 2/2003 | Fukumoto et al. | 180/446 |
| 6,747,421 B2* | 6/2004 | Kohn | 315/291 |
| 6,812,436 B2* | 11/2004 | Nomura et al. | 219/497 |
| 7,109,720 B2 | 9/2006 | Baurand et al. | |
| 2003/0151931 A1* | 8/2003 | Kohno | 363/22 |
| 2004/0047396 A1* | 3/2004 | Nomura et al. | 374/141 |
| 2004/0240140 A1* | 12/2004 | Maller et al. | 361/142 |
| 2008/0074215 A1* | 3/2008 | Zhou et al. | 335/132 |

FOREIGN PATENT DOCUMENTS

| | | |
|---|---|---|
| FR | 2834120 | 12/2001 |
| JP | H05074300 | 3/1993 |
| JP | 2004088938 A * | 3/2004 |
| JP | 2005-235561 | 9/2005 |
| JP | 2008-010167 | 1/2008 |

* cited by examiner

METHOD FOR EVALUATING THE TEMPERATURE OF AN ELECTRO-MAGNETIC CONTACTOR AND CONTACTOR FOR IMPLEMENTATION OF SAID METHOD

BACKGROUND OF THE INVENTION

The invention relates to a method for evaluating the temperature of a contactor comprising a processing unit designed to act on control means of the voltage of an actuating coil. Measuring means measure an electric current flowing in the actuating coil.

The invention also relates to a contactor for implementation of said method. The contactor comprises an electromagnetic actuator having a magnetic yoke and a ferromagnetic moving core, control means of an actuating coil. Measuring means measure an electric current in the actuating coil.

STATE OF THE PRIOR ART

Electric contactors are products that are sensitive to temperature. In particular, in the closing phase of the power contacts, a too high temperature can give rise to malfunctioning. Indeed, when the control voltage is applied to the contactor, the dynamic behaviour of the moving part of the contactor depends on the electric resistance of the coil. This resistance however depends on the temperature. Thus, when the temperature is too high, there is a risk of the power contacts having difficulty in closing, resulting in contact bounce, which may go as far as welding of these contacts then making opening of the contactor impossible. Furthermore, in the holding phase, overheating of the contactor may occur in the course of operation (e.g. heating of the connection terminals due to incorrect tightening, or heating of the power connection strips when the contactor is subjected to a current of too high power, or heating of the panel in which it is fitted, or opening/closing operations performed too close to one another or too frequently, etc.). Excessive heating of the product can however result in partial melting of the plastic supports which may prevent movement of the moving parts and in the worst cases block opening of the power contacts.

For this reason, certain electric contactors today integrate a temperature detector associated with processing means. Procedures for monitoring the temperature of a contactor are called on to be implemented increasingly often in the processing means of the contactors in order in particular to schedule suitable maintenance in the course of use of said contactor, The use of a temperature detector presents the drawback of measuring a local temperature generally not really corresponding to the temperature of the contactor coil. However, the risks of non-operation, in inrush phase or in holding phase, are strongly linked to the temperature value of the coil. Furthermore, implementation of these methods for evaluating the local temperature based on the use of specific sensors generally gives rise to additional costs which are often prohibitive for industrial use of the products.

SUMMARY OF THE INVENTION

The object of the invention is therefore to remedy the drawbacks of the state of the art so as to propose a method for evaluating the temperature of a contactor, based on determination of the temperature of the coil without any added sensors.

The method according to the invention consists in:
sending a closing order consisting in applying a voltage to the terminals of the actuating coil enabling the electric current flowing in the coil to be modified up to a first reference value;
sending a drop-out order consisting in fixing a voltage called drop-out voltage at the terminals of the actuating coil;
measuring the electric current flowing in said actuating coil;
performing acquisition of specific values on a signal of the electric current;
analyzing specific values for evaluation of the operating temperature of the actuating coil.

According to a first mode of development of the invention, the acquisition phase of specific values on the signal of the electric current flowing in the actuating coil consists in determining a second reference value of the electric current, the second reference value being reached after a decrease time or elapsed time.

According to a particular embodiment, the method consists in determining a second reference value equal to the value of the electric current flowing in the actuating coil after a set decrease time or set elapsed time, the second reference value being lower than the first reference value.

According to another particular embodiment, the method consists in determining a decrease time or elapsed time, for the electric current flowing in the actuating coil to reach, or decay to, an electric current value, the second reference value, which is fixed and lower than the first reference value.

According to this first embodiment, the method consists in determining the value of the resistance of the actuating coil from the first and second reference values and from the decrease time, said resistance of the actuating coil being expressed in the form of the equation:

$$(I2+U_{coil}/(R_{coil}+R_{eps}))/(I1+U_{coil}/(R_{coil}+R_{eps}))= \exp(-DT \times R_{coil}/L_{coil})$$

in which
$U_{coil}$ is equal to the voltage of the coil;
$R_{eps}$ is equal to the sum of the additional resistances present in the electronic circuit;
$L_{coil}$ is the inductance of the coil;
$DT=t2-t1$, corresponding to the time separating the moments when the current passes via the two reference values I1 and I2, on decrease.

Advantageously, the method consists in evaluating the temperature of the contactor versus the resistance of the actuating coil, the temperature of the actuating coil being expressed in the form of the equation:

$$T_{coil} = T_{init} + \frac{R_{coil}/R_{init} - 1}{\alpha}$$

in which
$\alpha$ is the thermal coefficient of the electric resistance (about 0.004);
$R_{init}$ is equal to a resistance of the coil at a temperature called initial temperature $T_{init}$;
$T_{init}$ is equal to a temperature called initial temperature generally equal to an ambient temperature.

According to a second mode of development of the invention, the acquisition phase of the specific values on the signal of the electric current flowing in the actuating coil consists in plotting a curve of the decrease of the electric current in said coil between the first reference value and a second reference value.

Advantageously, the analysis and evaluation phase consists in comparing said decrease curve with a reference curve of specific operation of the contactor, evaluation of the temperature resistance of the contactor then being dependent on the positioning of said decrease curve with respect to said reference curve.

According to an alternative embodiment, the step consisting in sending a drop-out order fixing a voltage called drop-out voltage at the terminals of the actuating coil is preceded by a stabilization phase of the electric current.

Advantageously, the electric current is stabilized at the first reference value.

Preferably, the drop-out voltage is fixed by the free wheel diode, the actuating coil being in "free wheel" mode throughout the whole of the decrease time.

The contactor according to the invention for implementation of the method for evaluating the temperature as defined above comprises a processing unit having:
means for performing acquisition of specific values on a signal of the electric current;
means for analyzing specific values for evaluation of the operating temperature of the actuating coil.

Preferably, the contactor comprises at least one free wheel diode connected in parallel with said at least one actuating coil and the measuring means.

BRIEF DESCRIPTION OF THE DRAWINGS

Other advantages and features will become more clearly apparent from the following description of particular embodiments of the invention, given for non-restrictive example purposes only and represented in the appended drawings, in which.

DETAILED DESCRIPTION OF AN EMBODIMENT

Figure 5:
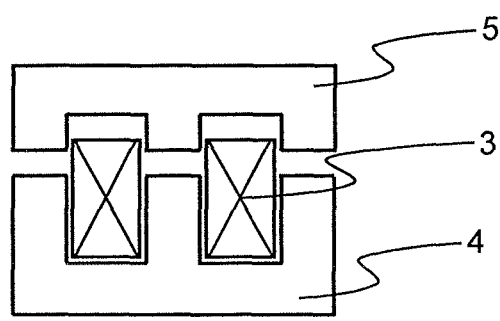
FIG. 5 represents a block diagram of a contactor actuator according to an embodiment of the invention.

The method for evaluating the temperature in an operating state of a contactor according to the invention is particularly intended for a contactor having an electromagnetic actuator comprising a magnetic circuit formed by a magnetic yoke 4 and a ferromagnetic moving core 5 (FIG. 5). Movement of the moving core is commanded by at least one actuating coil 3 connected to first and second power supply terminals B1, B2 via coil voltage control means 20. The first and second power supply terminals B1, B2 are further connected to the output terminals of a rectifying and filtering device, which has two input terminals A1 and A2. A processing unit 2 is designed to act on the voltage control means 20, such as in particular MOS or IGBT transistors.

The method for evaluating the temperature in an operating state of the contactor comprises four successive steps.
a preparation phase of the actuating coil 3;
a measuring phase of the electric current I in the actuating coil 3 with measuring means 24;
an acquisition phase of specific values on the signal of the electric current I flowing in the actuating coil 3.
an analysis phase of the specific values for evaluation of the operating temperature of the actuating coil 3.

The preparation phase consists in a first stage in sending a closing order to apply a voltage U to the terminals L1, L2 of the actuating coil 3 to bring the electric current I flowing in the coil to a first reference value I1. The preparation phase then consists in sending a drop-out order consisting in fixing a voltage called drop-out voltage at the terminals L1, L2 of the actuating coil 3. In advantageous manner, the preparation phase can include a stabilization phase. The current I can in fact be stabilized at said reference value I1 during a sufficient time to enable the magnetic flux in the actuator to itself be stabilized. After this intermediate stabilization phase, the drop-out order can then be sent.

The measuring phase consists in measuring the decrease of the electric current in the actuating coil until the current reaches a second reference value I2.

According to a first preferred embodiment of the invention, the acquisition phase of the specific values on the signal of the electric current I flowing in the actuating coil 3 consists in determining a second reference value I2 of the electric current. The second reference value I2 is reached after a decrease time DT According to a first particular mode of the first preferred embodiment, the method consists in fixing a decrease time DT and in acquiring the second reference value I2.

According to a second particular mode of the first preferred embodiment, the method consists in fixing the second reference value I2 and in acquiring the decrease time DT necessary for the electric current I to go from a first reference value I1 to the second reference value I2

The analysis and evaluation phase then consists in determining the resistance $R_{coil}$ of the actuating coil 3 from the first and second reference values I1, I2 and from the decrease time DT. According to this first embodiment, evaluation of the temperature of the contactor is a function of said resistance $R_{coil}$ of the actuating coil.

The equation of the current decrease is then the following:

$$I(t)=(I1+U_{coil}/(R_{coil}+R_{eps}))\times\exp(-(t-t1)\times R_{coil}/L_{coil})-U_{coil}/(R_{coil}+R_{eps})$$

with
$U_{coil}$ equal to the coil voltage;
$R_{eps}$ equal to the sum of the additional resistances present in the electronic circuit, such as the resistance of the measuring means 24 and/or the resistance of the selector switch in on state;
$L_{coil}$ the inductance of the coil;
t1 a current decrease measuring time for which the value of the current is I1.

If the measuring time is equal to the value t2, then the second reference value I2 can be written in the following form:

$$I2=(I1+U_{coil}/(R_{coil}+R_{eps}))\times\exp(-DT\times R_{coil}/L_{coil})-U_{coil}/(R_{coil}+R_{eps})$$

with DT=t2−t1, corresponding to the time separating the moments when the current passes via the two reference values I1 and I2, when decreasing.

Which is also written:

$$(I2+U_{coil}/(R_{coil}+R_{eps}))/(I1U_{coil}/(R_{coil}+R_{eps}))= \exp(-DT \times R_{coil}/L_{coil})$$

The variation of the current I in an actuating coil 3 subjected to a known drop-out voltage $U_{coil}$ is therefore directly linked to the resistance $R_{coil}$ of said coil. The other parameters are fixed or known.

The temperature evaluation phase is performed by knowing $R_{coil}$. The temperature of the actuating coil 3 is expressed in the form of the equation:

$$T_{coil} = T_{init} + \frac{R_{coil}/R_{init} - 1}{\alpha}$$

With
- $\alpha$ the thermal coefficient of the electric resistance (about 0.004 K$^{-1}$)
- $R_{init}$ equal to a resistance of the coil at a temperature called initial temperature $T_{init}$
- $T_{init}$ equal to a temperature called initial temperature generally equal to an ambient temperature.

Figure 4:
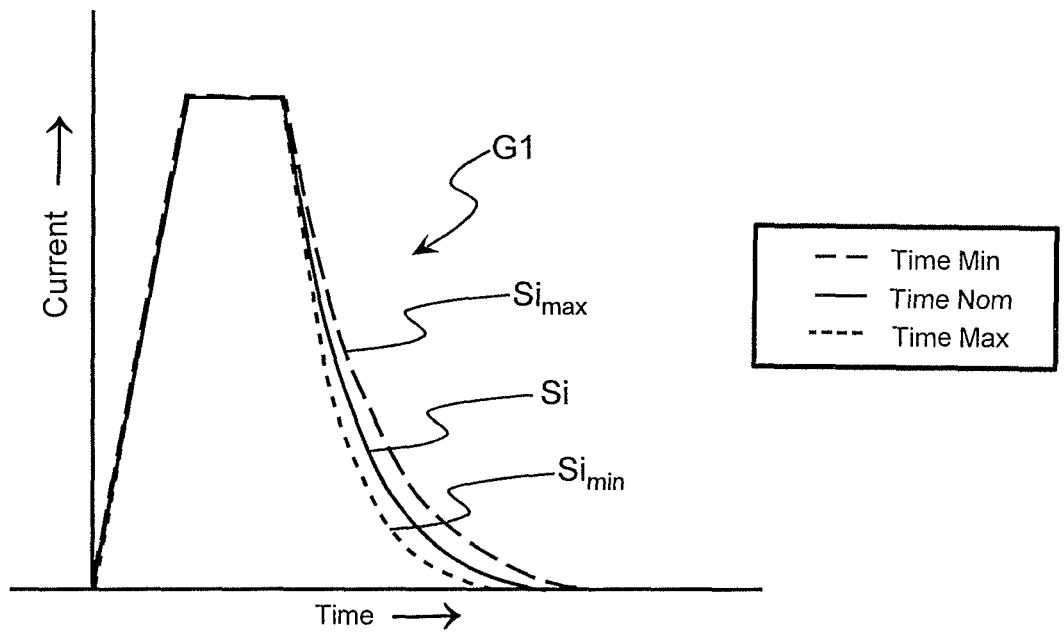
FIG. 4 represents plots of a drop-out current and of a reference curve respectively corresponding to theoretical curves of current variations for a contactor operating at minimum and maximum tolerated temperatures.

According to a second preferred embodiment of the invention, the acquisition phase of the specific values on the signal of the electric current I flowing in the actuating coil 3 consists in plotting a decrease curve Si of the electric current I in the actuating coil 3 between the first reference value I1 and a second reference value I2. The analysis and evaluation phase then consists in comparing said decrease curve Si with a reference curve G1 of specific operation of the contactor. As represented in FIG. 4, the reference curve G1 of operation comprises two theoretic decrease curves $Si_{max}$, $Si_{min}$.

A first theoretic decrease curve $Si_{max}$ corresponds to a contactor operating at an acceptable minimum temperature.

A second theoretic decrease curve $Si_{min}$ corresponds to a contactor operating at an acceptable maximum temperature.

Evaluation of the temperature of the contactor is then a function of the positioning of said decrease curve Si with respect to the two theoretic decrease curves of the reference G1.

Figure 1:
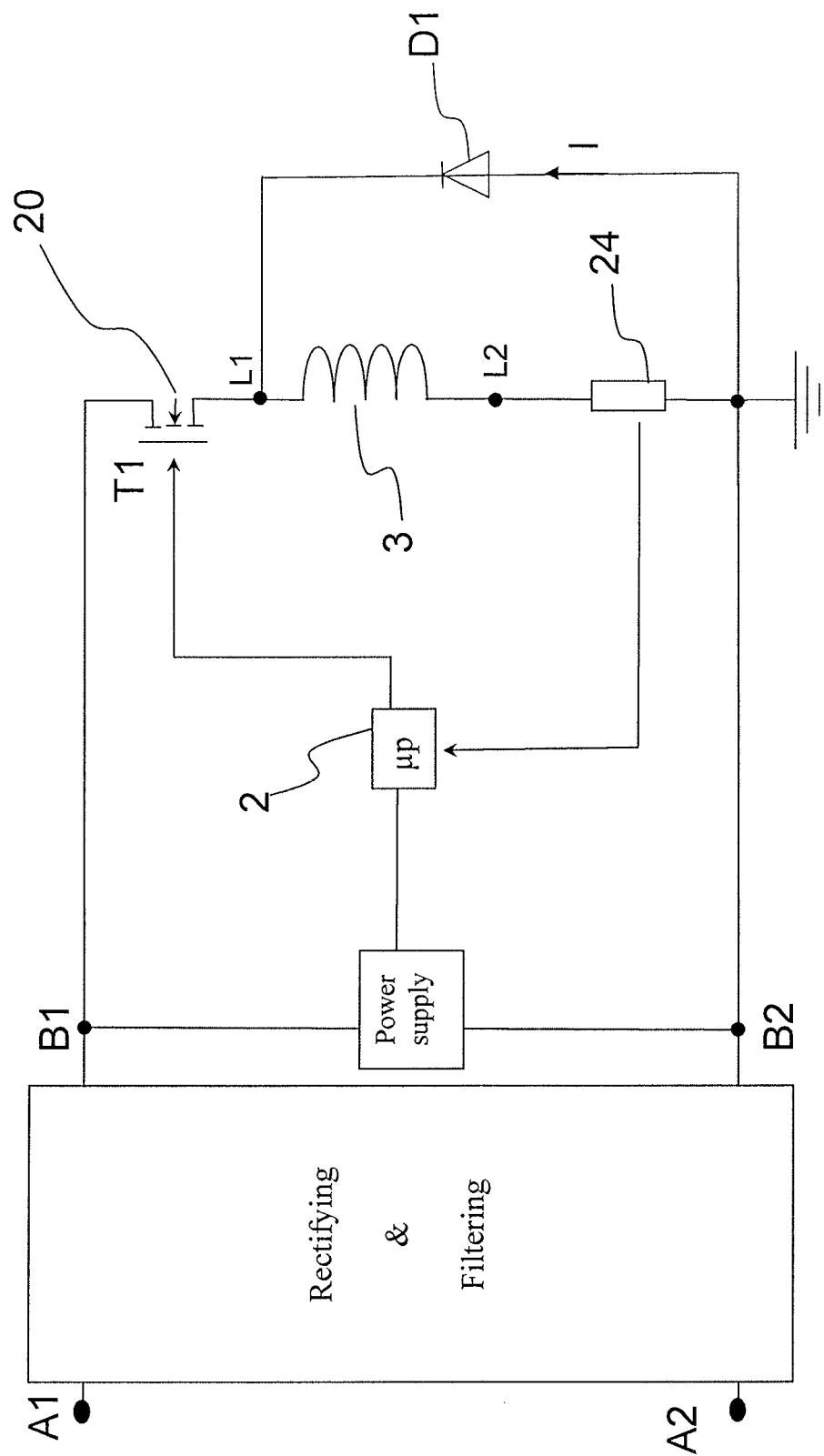
FIGS. 1 and 2 represent functional wiring diagrams of control and regulation circuits suitable for implementation of a method for evaluating according to the different embodiments of the invention.

The contactor for implementation of the method according to the invention then comprises measuring means 24 of the electric current I flowing in the actuating coil 3 (FIG. 1). Said means can comprise a resistive shunt placed in series with the actuating coil 3. Finally, a free wheel diode D1 is connected in parallel with the assembly formed by said at least actuating coil 3 of the measuring means 24 of the electric current I.

The control means 20 send a drop-out order consisting in fixing a voltage called drop-out voltage at the terminals L1, L2 of the actuating coil 3. The drop-out voltage is then fixed by the free wheel diode D1. The coil is then in "free wheel" mode during the measuring phase.

Figure 2:
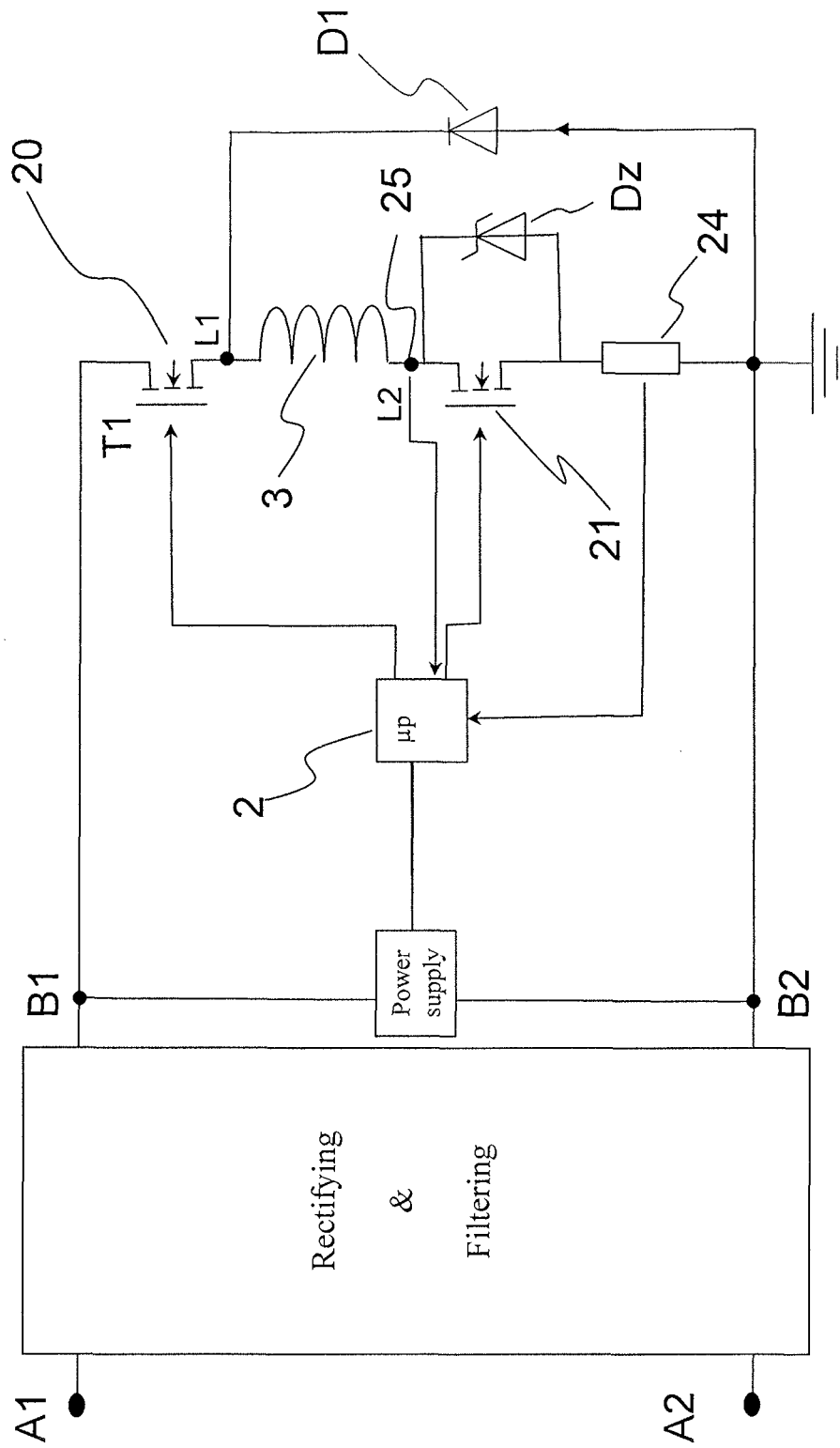

According to an alternative embodiment, a Zener diode Dz can be connected in series with the actuating coil 3. According to FIG. 2, the Zener diode Dz is preferably inserted in series with the actuating coil 3 and the measuring means 24 of the electric current I. Shunting means 21 connected in parallel with said diode are designed to shunt said diode Zener when the latter are in a closed position. The drop-out voltage can then be fixed by the "Zener" diode, the "shunting" means 21 being in an open position. The coil is then in "Zener" mode during the measuring phase.

Figure 3:
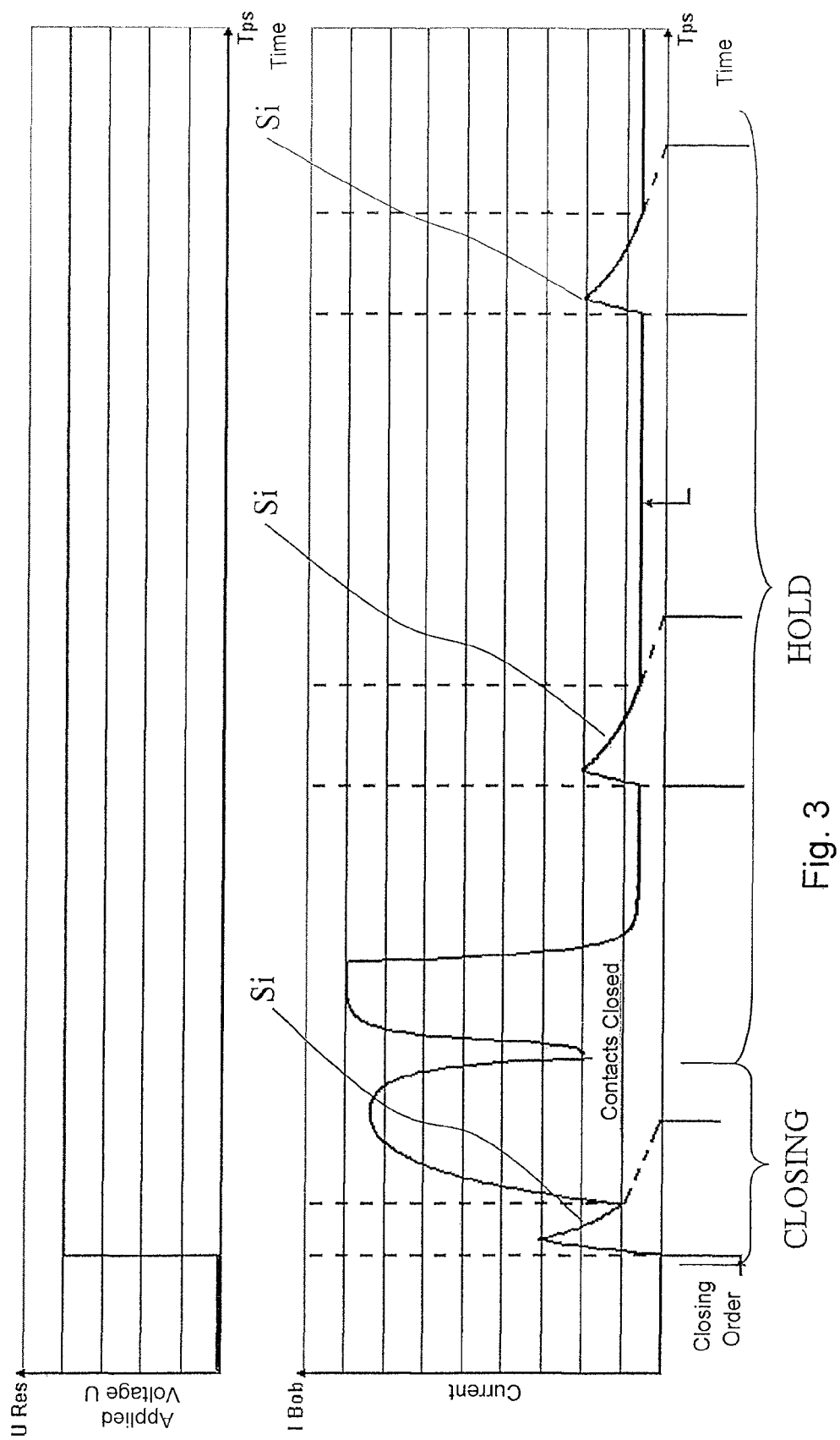
FIG. 3 represents curve plots of the current variations measured in the course of the method for evaluating the temperature of a contactor in different operating states.

As represented in FIG. 3, the method for evaluating the temperature according to the invention can be applied at the beginning of the closing phase of a contactor so as to be able to prevent closing of the latter if the temperature conditions are unfavourable. Furthermore, the method for evaluating the temperature according to the invention can also be applied in periodic manner during the holding phase of the electromagnetic contactor in the closed position, so as to provide regular information on the thermal state.

The invention claimed is:

1. A method for evaluating the temperature of a contactor, which contactor comprises:
   power contacts movable to and from open and closed positions, respectively,
   at least one actuating coil,
   control means of voltage applied to the actuating coil,
      a processing unit designed to act on the control means of the voltage applied to the actuating coil, and
      measuring means of electric current flowing in said at least one actuating coil;
   said method, comprising:
      sending a closing order from the processing unit which applies a voltage V1 to terminals of the actuating coil enabling an electric current to flow in the coil up to a first reference value I1;
      sending a drop-out order from the processing unit to the control means thereby fixing a drop-out voltage at the terminals of the actuating coil;
   setting a reference value of one of (a) an electric current I2 flowing in the actuating coil, or (b) a time elapsed DT, alter a drop-out order is sent;
      and if electric current (a) is the set reference value, then measuring the time elapsed DT for the electric current to reach said set reference value after a drop-out order is sent,
      or if time elapsed (b) after a drop-out order is sent is the set reference value, then measuring the second electric current I2 flowing in the actuating coil at said set reference value of elapsed time;
      the processing unit determining the operating temperature of the actuating coil-after a drop-out order has been sent by:
   determining the value of the resistance Rcoil of the actuating coil from the first and second reference values of the electric current and the elapsed time, said resistance of the actuating coil being expressed in the equation:

$$(I2+U_{coil}/(R_{coil}+R_{eps}))/(I1+U_{coil}/(R_{coil}+R_{eps}))= \exp(-DT \times R_{coil}/L_{coil})$$

wherein:
   I1 is the first reference value of the electric current,
   I2 is the second value of the electric current,
   DT is the elapsed time,
   $U_{coil}$ is equal to the coil voltage,
   $R_{eps}$ is equal to the sum of the additional resistances present in the electronic circuit, and
   $L_{coil}$ is the inductance of the coil;
   and wherein, the temperature $T_{bob}$ of the actuating coil is expressed in the equation:

$$T_{bob} = T_{init} + (R_{bob}/R_{init} - 1)/\alpha,$$

wherein:
   $\alpha$ is the thermal coefficient of the electric resistance, and
   $R_{init}$ is equal to a resistance of the coil at an initial temperature $T_{init}$;
   and voltage $U_{coil}$ applied to the coil by the control means is maintained in a range between voltage V1 corresponding to the first reference value I1 of the electric current, and a voltage V2 corresponding to the second value I2 of the electric current, which range correlates to a corresponding range of operating temperatures.

2. The method for evaluating according to claim 1, wherein the second value I2 is lower than the first reference value I1.

3. The method for evaluating according to claim 1, comprises measuring an elapsed time DT of the electric current flowing in the actuating coil to reach an electric current value I2, the electric current reference value being set and being lower than the first reference value.

4. The method for evaluating according to claim 1, wherein measuring values of the electric current flowing in the actuating coil comprises plotting a decrease curve of the electric current in said coil between the first reference value and a second value.

5. The method for evaluating according to claim 4, wherein determining the operating temperature of the actuating coil comprises comparing said decrease curve with a specific reference curve of operation of the contactor, evaluation of the temperature resistance of the contactor as a function of the positioning of said decrease curve with respect to said reference curve.

6. The method for evaluating according to claim 1, wherein sending a drop-out order fixing a drop-out voltage at the terminals of the actuating coil is preceded by stabilization of the electric current.

7. The method for evaluating according to claim 6, wherein the electric current is stabilized at the first reference value.

8. The method for evaluating according to claim 1, wherein the drop-out voltage is fixed by a free wheel diode which places the actuating coil in "free wheel" mode throughout the entire period of elapsed time.

9. A contactor for implementation of the method for evaluating the temperature according claim 1, comprising:
    an electromagnetic actuator having a magnetic yoke and a ferromagnetic moving core;
    an actuating coil;
    control means connected to the actuating coil;
    measuring means of the electric current in the actuating coil;
    a processing unit having:
        means for measuring an electric current flowing in the actuating coil, and measuring an elapsed time after a drop-out order from the control means to fix a drop-out voltage across the actuating coil;
        means for analyzing said electric current and said elapsed time for evaluation of the operating temperature of the actuating coil.

10. The contactor according to claim 9, comprising at least one free wheel diode connected in parallel with said at least one actuating coil and the measuring means.

11. The method for evaluating according to claim 1 wherein said method is commenced after an initial evaluation of an initial $R_{coil}$ and finding a corresponding acceptable temperature, and upon commencement of a closing phase initiated by sending another closing order causing application of another voltage V1 which results in closure of the power contacts of the contactor.

12. The method for evaluating according to claim 11, wherein finding a corresponding acceptable temperature comprises finding an initial $T_{bob}$ temperature corresponding to said initial $R_{coil}$, and determining that said initial $T_{bob}$ is within said range of operating temperatures which correlate to the voltage range V1 to V2.

13. Periodically repeating the method for evaluating according to claim 1 for periodically checking the temperature of the contactor.

* * * * *